United States Patent
Fischer et al.

(10) Patent No.: US 10,761,714 B2
(45) Date of Patent: Sep. 1, 2020

(54) RECOGNIZING GESTURES AND UPDATING DISPLAY BY COORDINATOR

(71) Applicant: GOOGLE INC., Mountain View, CA (US)

(72) Inventors: Ian Fischer, San Francisco, CA (US); Chinmay Sunil Garde, San Francisco, CA (US)

(73) Assignee: Google LLC, Mountain View, CA (US)

(*) Notice: Subject to any disclaimer, the term of this patent is extended or adjusted under 35 U.S.C. 154(b) by 463 days.

(21) Appl. No.: 14/949,387

(22) Filed: Nov. 23, 2015

(65) Prior Publication Data
US 2017/0147176 A1    May 25, 2017

(51) Int. Cl.
| | |
|---|---|
| G06F 3/0488 | (2013.01) |
| G06F 9/451 | (2018.01) |
| G06F 3/0481 | (2013.01) |
| G06F 3/0484 | (2013.01) |

(52) U.S. Cl.
CPC .......... *G06F 3/0488* (2013.01); *G06F 3/0484* (2013.01); *G06F 3/04817* (2013.01); *G06F 3/04883* (2013.01); *G06F 9/451* (2018.02)

(58) Field of Classification Search
CPC .. G06F 3/0488; G06F 3/04817; G06F 3/0484; G06F 3/04883; G06F 9/451; G11B 27/036; G11B 27/10; G11B 27/34; H04N 5/23293; H04N 5/77; H04N 5/772
See application file for complete search history.

(56) References Cited

U.S. PATENT DOCUMENTS

| | | | |
|---|---|---|---|
| 6,598,068 B1 * | 7/2003 | Clark | G06F 9/52 718/104 |
| 7,246,312 B2 * | 7/2007 | Harnngton | G06Q 10/04 715/255 |
| 7,487,445 B2 * | 2/2009 | Purvis | G06F 17/211 715/247 |

(Continued)

FOREIGN PATENT DOCUMENTS

WO    2016047898 A1    3/2016

OTHER PUBLICATIONS

Williams, "C++ Concurrency in Action", Manning Publications Co., 2012, 6 pages.

(Continued)

*Primary Examiner* — Renee D Chavez
*Assistant Examiner* — Jeremy L Stanley
(74) *Attorney, Agent, or Firm* — Brake Hughes Bellermann LLP

(57) ABSTRACT

A non-transitory computer-readable storage medium may comprise instructions stored thereon. When executed by at least one processor, the instructions may be configured to cause a computing device to implement at least a user interface module and a coordinator module. The user interface module may be configured to pass layout constraints to the coordinator module. The coordinator module may be configured to process input received by the computing device, recognize gestures based on the input, update a display based on the recognized gestures and the layout constraints passed to the coordinator module by the user interface module, and in response to recognizing an application-specific gesture, pass the application-specific gesture to the user interface module.

20 Claims, 5 Drawing Sheets

(56) References Cited

U.S. PATENT DOCUMENTS

| | | | | |
|---|---|---|---|---|
| 7,707,493 | B2* | 4/2010 | Vion-Dury | G06F 17/2247 715/234 |
| 7,784,051 | B2* | 8/2010 | Mensing | G06F 9/485 712/220 |
| 7,788,674 | B1* | 8/2010 | Siegenfeld | G06F 9/54 709/201 |
| 7,877,703 | B1* | 1/2011 | Fleming | G06F 9/541 715/788 |
| 8,046,737 | B2* | 10/2011 | Wittenberg | G06F 8/00 717/109 |
| 8,166,023 | B2* | 4/2012 | Melcher | G06F 17/30873 707/722 |
| 8,176,445 | B1* | 5/2012 | Qian | G06F 17/5068 716/122 |
| 8,416,205 | B2* | 4/2013 | Rapp | G06F 3/0481 345/173 |
| 8,421,762 | B2* | 4/2013 | Rapp | G06F 3/0481 345/173 |
| 8,589,925 | B2* | 11/2013 | Cwalina | G06F 9/4806 718/100 |
| 9,019,223 | B2* | 4/2015 | Tijssen | G06F 3/041 345/173 |
| 9,110,581 | B2* | 8/2015 | Momchilov | G06F 3/038 |
| 9,128,733 | B2* | 9/2015 | Taron | G06F 9/4443 |
| 9,152,395 | B2* | 10/2015 | Luengen | G06F 8/38 |
| 9,348,491 | B2* | 5/2016 | LeMarquand | G06F 3/0484 |
| 9,405,449 | B2* | 8/2016 | Winternitz | G06F 3/04845 |
| 9,471,214 | B2* | 10/2016 | Hunt | G06F 3/0481 |
| 9,489,080 | B2* | 11/2016 | Seo | G06F 1/1641 |
| 9,830,072 | B2* | 11/2017 | Liang | G06F 3/04883 |
| 9,870,133 | B2* | 1/2018 | Ferry | G06F 8/38 |
| 9,880,727 | B2* | 1/2018 | Zheng | G06F 3/0488 |
| 9,886,178 | B2* | 2/2018 | Kendall | G06F 3/04845 |
| 2001/0027462 | A1* | 10/2001 | Muramatsu | G06F 9/485 718/102 |
| 2002/0144003 | A1* | 10/2002 | Jin | G06F 9/544 719/310 |
| 2005/0094206 | A1* | 5/2005 | Tonisson | G06F 17/211 358/1.18 |
| 2006/0031838 | A1* | 2/2006 | Chrabieh | G06F 9/4881 718/100 |
| 2006/0236322 | A1* | 10/2006 | Brackman | G06F 9/4806 718/103 |
| 2006/0256134 | A1* | 11/2006 | Widdowson | G06Q 10/043 345/629 |
| 2006/0279566 | A1* | 12/2006 | Atkins | G06F 17/211 345/418 |
| 2007/0083813 | A1* | 4/2007 | Lui | G06F 11/3612 715/709 |
| 2011/0126210 | A1* | 5/2011 | Rivard | G06F 9/451 718/108 |
| 2012/0144406 | A1* | 6/2012 | Colombo | G06F 9/52 719/328 |
| 2012/0174121 | A1* | 7/2012 | Treat | G06F 9/542 719/318 |
| 2012/0284663 | A1* | 11/2012 | Driver | G06F 3/0485 715/784 |
| 2013/0038552 | A1* | 2/2013 | Chan | G06F 3/04883 345/173 |
| 2013/0307788 | A1* | 11/2013 | Rao | G06F 3/0488 345/173 |
| 2014/0033136 | A1* | 1/2014 | St. Clair | G06F 3/017 715/863 |
| 2014/0101619 | A1* | 4/2014 | Kaldor | G06F 3/04842 715/863 |
| 2014/0130053 | A1* | 5/2014 | Xiao | G06F 9/46 718/102 |
| 2014/0173435 | A1* | 6/2014 | Arnold | G06F 9/451 715/719 |
| 2014/0282129 | A1* | 9/2014 | Du | G06Q 50/01 715/762 |
| 2015/0007308 | A1* | 1/2015 | Mankowski | G06F 21/31 726/19 |
| 2015/0025877 | A1* | 1/2015 | Ueno | G06F 3/0237 704/9 |
| 2015/0120553 | A1* | 4/2015 | Li | G06F 1/1694 705/44 |
| 2015/0193959 | A1* | 7/2015 | Shah | G06F 3/00 345/473 |
| 2015/0339002 | A1* | 11/2015 | Arnold | G06F 3/0481 715/854 |
| 2015/0339006 | A1* | 11/2015 | Chaland | G06F 3/0482 715/835 |
| 2015/0362999 | A1* | 12/2015 | Kim | G06F 3/017 715/716 |
| 2016/0062468 | A1* | 3/2016 | Livshits | G06F 3/011 345/156 |
| 2016/0085583 | A1* | 3/2016 | Goodson | G06F 9/4881 718/108 |

OTHER PUBLICATIONS

"Declarative Programming", from Wikipedia, the free encyclopedia, retrieved on Oct. 29, 2015 from https://en.wikipedia.org/wiki/Declarative_programming, 4 pages.

"Multithreaded Rasterization", The Chromium Projects, retrieved on Oct. 20, 2015 from https://www.chromium.org/developers/designdocuments/implsidepainting, 5 pages.

"Part 2—Working with the UI Thread", Xamarin Guide, retrieved on Oct. 15, 2015 from https://developer.xamarin.com/guides/ios/user_interface/controls/part_2_-_working_with_the_ui_thread/, 3 pages.

"Scrollbar", from Wikipedia, the free encyclopedia, retrieved on Oct. 29, 2015 from https://en.wikipedia.org/wiki/Scrollbar, 4 pages.

"Understanding Auto Layout", Apple Inc., retrieved on Oct. 15, 2015 from https://developer.apple.com/library/ios/documentation/UserExperience/Conceptual/AutolayoutPG/index.html, 3 pages.

Badros, et al, "The Cassowary Linear Arithmetic Constraint Solving Algorithm", ACM Transactions on Computer-Human Interaction, vol. 7, No. 7, 2002, pp. 1-30.

Bryant, et al., "Computer Systems—A Programmer's Perspective", 2011, 3 pages.

International Search Report and Written Opinion for PCT Application No. PCT/US2016/062049, dated Feb. 13, 2017, 14 pages.

* cited by examiner

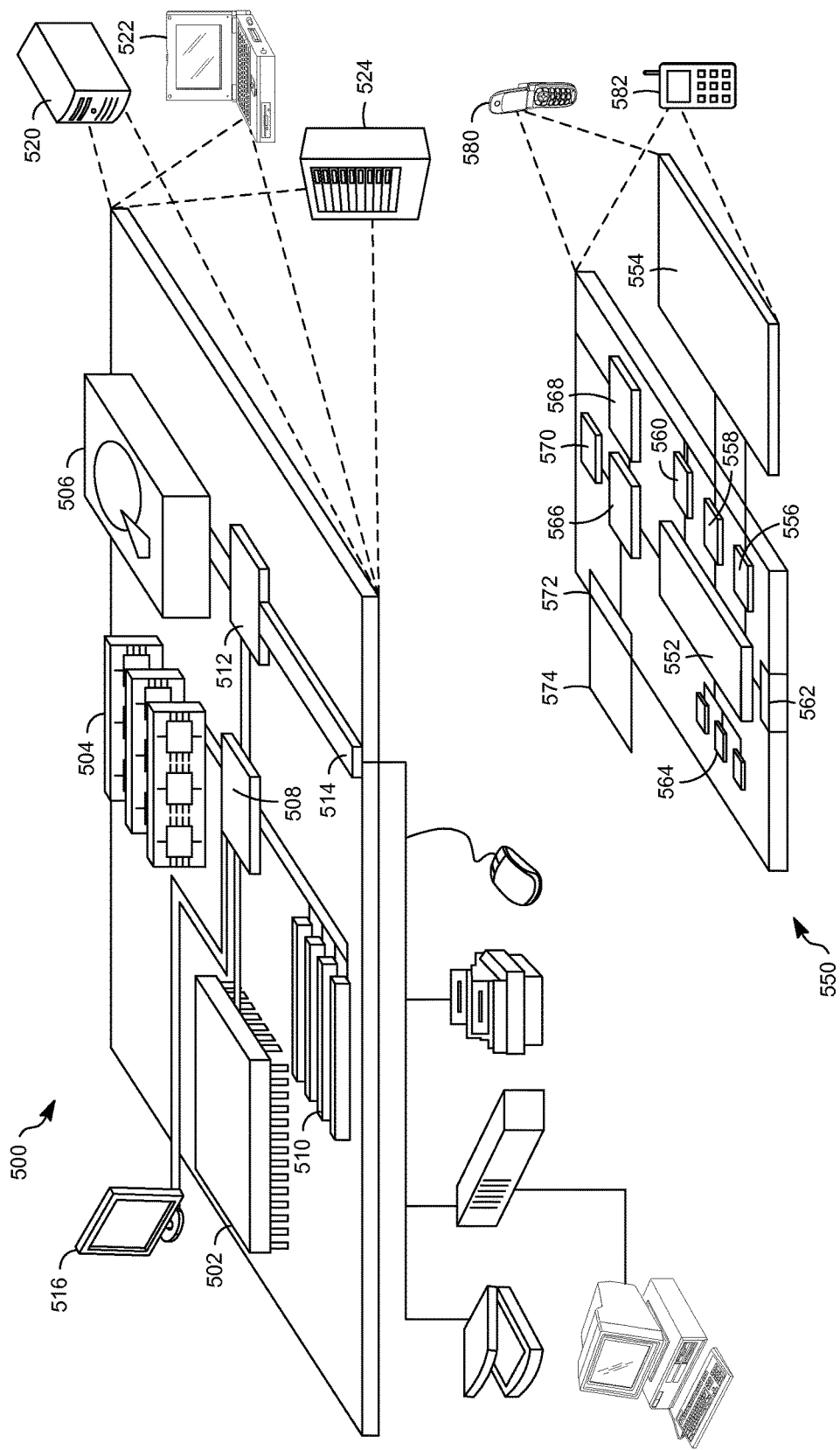

RECOGNIZING GESTURES AND UPDATING DISPLAY BY COORDINATOR

BACKGROUND

Input into user interfaces on a computer system may involve multiple threads or processes passing information about the input to each other. Context switches between threads or processes to update the display based on the input may consume processor and/or memory resources, slowing the computer system down.

SUMMARY

This description relates to updating a display with graphical elements in response to receiving input.

To reduce the number of context switches, a coordinator module or thread may process the input, recognize gestures based on the input, and update a display based on the recognized gestures. The coordinator module or thread may continue to run, while a user interface module or thread sleeps or waits for a signal from the coordinator module or thread or performs other work concurrently. The coordinator module or thread may recognize a gesture as an application-specific gesture, and send a signal notifying the user interface module or thread and pass the application-specific gesture to the user interface module or thread. The user interface module or thread may, in response to the notification from the coordinator module or thread, wake up or resume, and prompt an application to perform an action based on the application-specific gesture passed by the coordinator module or thread to the user interface module or thread.

According to one example, a non-transitory computer-readable storage medium may comprise instructions stored thereon. When executed by at least one processor, the instructions may be configured to cause a computing device to implement at least a user interface module and a coordinator module. The user interface module may be configured to pass layout constraints to the coordinator module. The coordinator module may be configured to process input received by the computing device, recognize gestures based on the input, update a display based on the recognized gestures and the layout constraints passed to the coordinator module by the user interface module, and in response to recognizing an application-specific gesture, pass the application-specific gesture to the user interface module.

According to another example, a non-transitory computer-readable storage medium comprising instructions stored thereon. When executed by at least one processor, the instructions may be configured to cause a computing device to launch at least a user interface thread and a coordinator thread. The user interface thread may be configured to pass layout constraints to the coordinator thread. The coordinator thread may be configured to process input received by the computing device, recognize gestures based on the input, update a display based on the recognized gestures and the layout constraints passed to the coordinator thread by the user interface thread, and in response to recognizing an application-specific gesture, pass the application-specific gesture to the user interface thread.

According to another example, a computing device may comprise a touchscreen configured to display user interface elements and receive touch input, at least one processor, and at least one memory device. The at least one memory device may comprise instructions stored thereon that, when executed by the at least one processor, are configured to cause the computing device to implement a user interface module and a coordinator module. The user interface module may be configured to pass layout constraints to a coordinator module. The coordinator module may be configured to process the touch input received by the touchscreen, recognize gestures based on the touch input, update user interface elements displayed by the touchscreen based on the recognized gestures and the layout constraints passed to the coordinator module by the user interface module, and in response to recognizing an application-specific gesture, pass the application-specific gesture to the user interface module.

The details of one or more implementations are set forth in the accompanying drawings and the description below. Other features will be apparent from the description and drawings, and from the claims.

BRIEF DESCRIPTION OF THE DRAWINGS

FIG. 5 shows an example of a computer device and a mobile computer device that can be used to implement the techniques described here.

DETAILED DESCRIPTION

Figure 1:
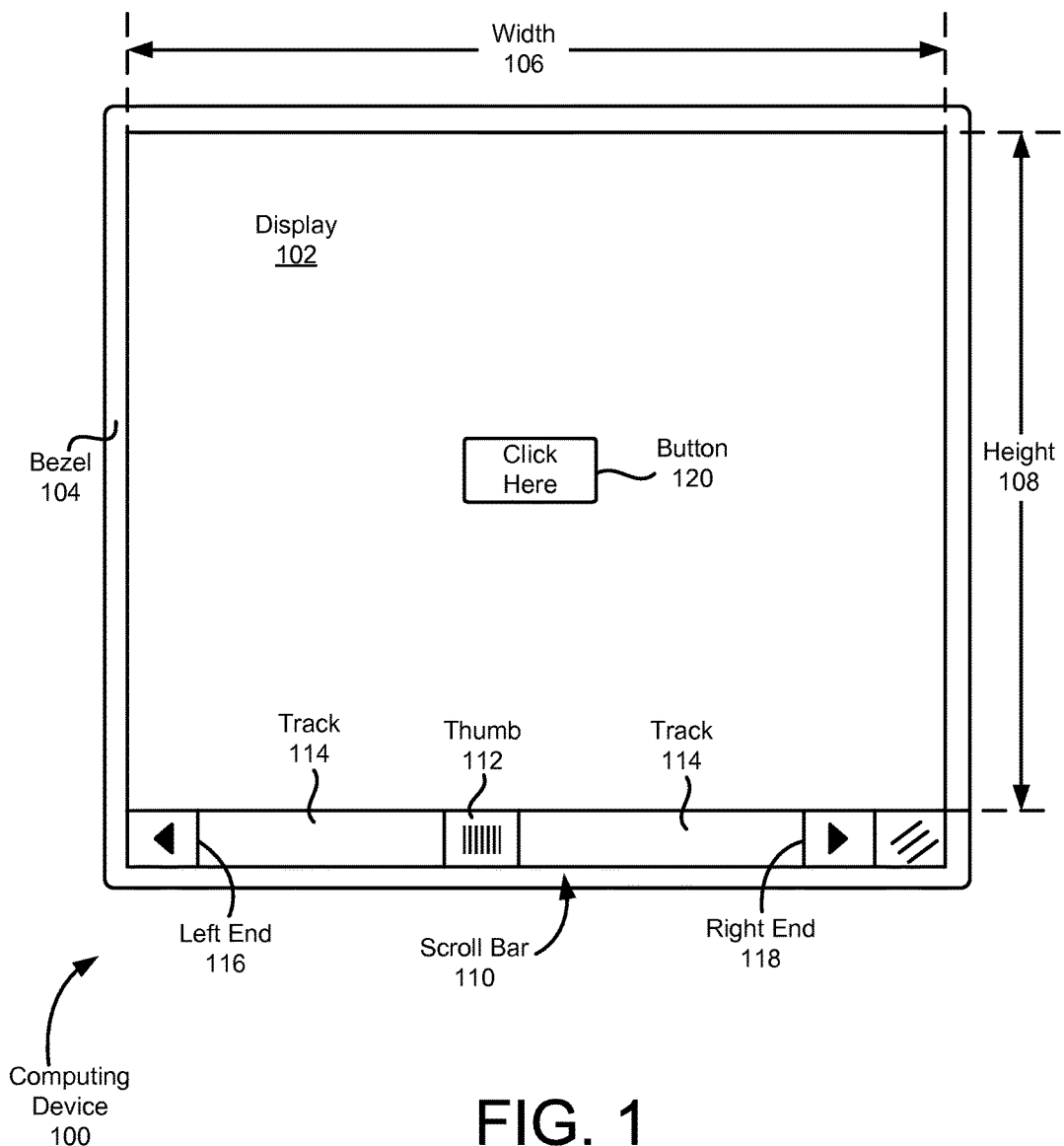
FIG. 1 shows a computing device displaying user interface elements according to an example implementation.

FIG. 1 shows a computing device 100 displaying user interface elements according to an example implementation. The computing device 100 may include a tablet computer, smartphone, netbook, thin client, laptop computer, or desktop computer, according to example implementations. In this example, the computing device 100 may include a display 102 surrounded by a bezel 104. The display 102 may present graphical and/or visual output to a user. In an example implementation, the display 102 may include a touchscreen that receives touch input from the user, such as gestures including touches, taps, drags, pinches, or swipes. The gestures may be applied to user interface elements on the display such as buttons.

The display 102 may have a width 106, which may be measured in units of length such as inches or centimeters, or may be measured in pixels. The display 102 may also have a height 108 or length, which may also be measured in units of length such as inches or centimeters, or may be measured in pixels.

The computing device 100 may determine and/or maintain locations of user interface elements on the display, such as a scroll bar 110 and a button 120, within constraints. While the scroll bar 110 and button are shown in the example of FIG. 1, other user interface elements, such as icons, hyperlinks, or a touch keyboard, may be included in the display 102, according to example embodiments. The computing device 100 may determine the constraints for locations of the user interface elements.

For example, the scroll bar 110 may be located at a bottom of the display 102. A thumb 112 of the scroll bar 110 may be located anywhere within a track 114 of the scroll bar. The track 114 may be bounded to the left by a left end 116 of the scroll bar 110, and may be bounded to the right by a right end 118 of the scroll bar 110. Moving the thumb 112 may not be an application-specific gesture. Moving the thumb 112 within the track 114 of the scroll bar 110 may change what is presented on the display 102, but may not prompt action by any applications running on the computing device 100.

The constraints may require the button 120 to be above the scroll bar 110. A recognized gesture of clicking on and/or pressing the button 120 may be an application-specific gesture. The computing device 100 may respond to a user clicking on and/or pressing the button 120 by prompting an application to perform an action.

Figure 2:
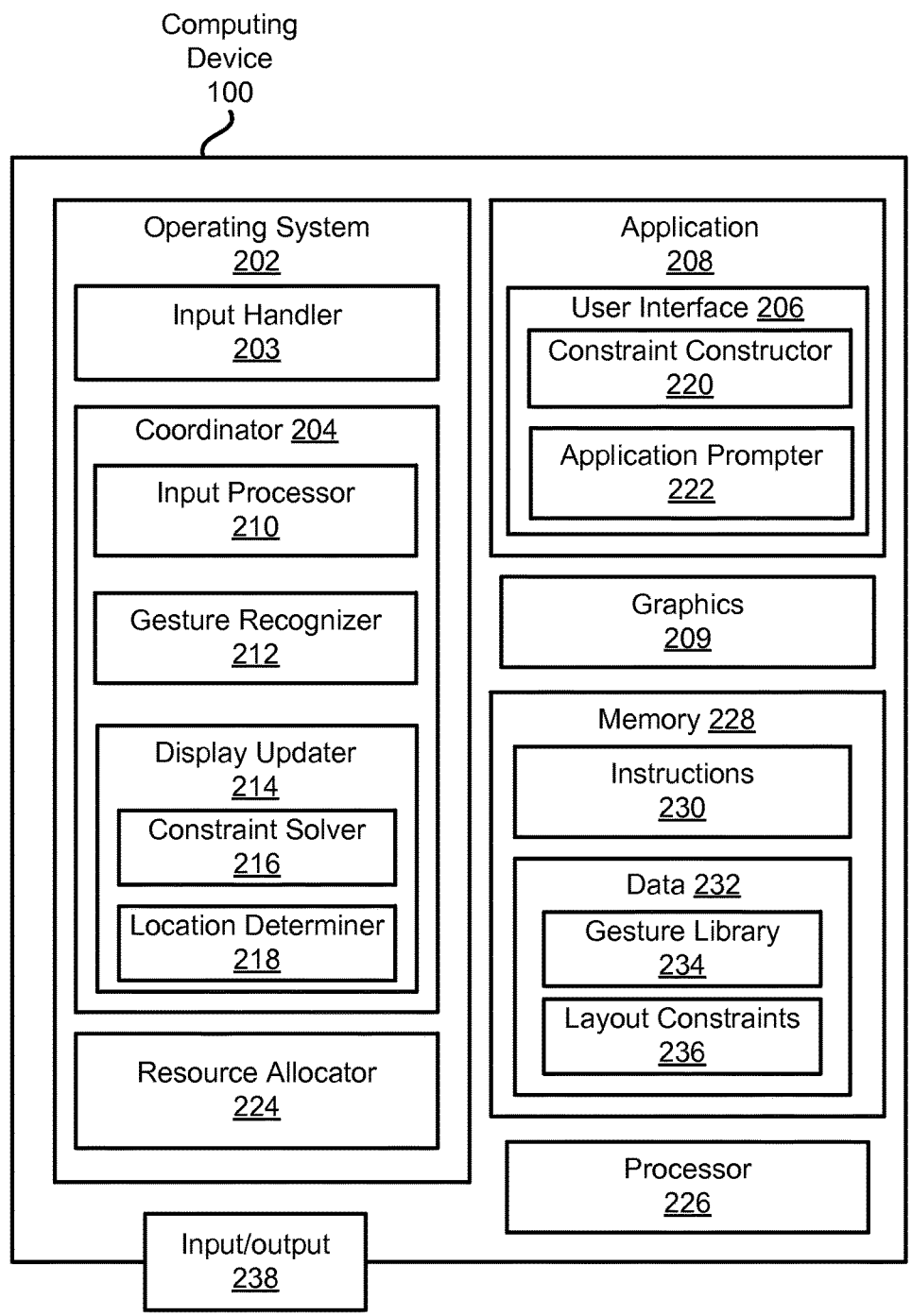
FIG. 2 is a schematic diagram showing the computing device according to an example implementation.

FIG. 2 is a schematic diagram showing the computing device 100 according to an example implementation. In this example, the computing device 100 may have processes running including an operating system 202. The operating system 202 may implement an input handler 203. The input handler 203 may listen for inputs to hardware input devices, such as a touchscreen, and may receive interrupts from the hardware input devices. The input handler 203 may pass the input events on to a coordinator module 204, described below.

The operating system 202 process may implement a coordinator module 204. The coordinator module 204 may determine locations of user interface elements and update the display 102, and may communicate with a user interface module 206. The user interface module 206 may run within an application 208. The application 208 may run as a separate process from the operating system 202, or as a process within the operating system 202. The coordinator module 204 and user interface module 206 may be implemented as separate threads, such as within the operating system 202 process or within separate processes such as the operating system 202 and an application 208 process. As described herein, a process may be a logical control flow that is scheduled and maintained by a kernel of the operating system 202, having its own virtual address space. Threads may be logical flows that run in the context of a single process and are scheduled by the kernel, and share the virtual address space with other threads running in the same process. While the coordinator module 204 and user interface module 206 are described herein as being implemented on different threads within different processes, the coordinator module 204 and user interface module 206 may also be implemented as different threads on a same process, or as different processes, according to example implementations. The computing device 100 may also include a graphics module 209. The graphics module 209 may update the images presented by the display 102 based on instructions received from the coordinator module 204 and/or user interface module 206.

The user interface module 206 may pass layout and/or input constraints to the coordinator module 204. The user interface module 206 may also pass changes to default responses to inputs to the coordinator module 204. The coordinator module 204 may process raw touch input received by the computing device 100 and handled by the input handler 203, and may recognize gestures based on the raw touch input. The coordinator module 204 may update the display 102 (shown in FIG. 1) based on the recognized gestures and the layout and input constraints. The coordinator module 204 updating the display 102 may include sending instructions to the graphics module 209 to update and/or change the content presented by the display 102. If the coordinator module 204 recognizes a gesture as an application-specific gesture, the coordinator module 204 may pass the application-specific gesture to the user interface module 206. The user interface module 206 may prompt an application 208, which may run in a separate process from the coordinator module 204 or thread, and may have launched the user interface module 206 or thread, to perform an action in response to receiving the application-specific gesture from the user interface module 206, which the user interface module 206 received from the coordinator module 204.

The user interface module 206 or thread may inform the coordinator module 204 or thread of constraints between properties of user interface elements (herein called layout constraints) in order to allow the coordinator thread 204 to automate the positioning and display of those user interface elements. The user interface module 206 or thread may also inform the coordinator module 204 or thread of constraints between properties of future input events and user interface elements (which may be considered input constraints) in order to allow the coordinator module 204 or thread to manage more updates of the user interface without having to consult the user interface module 206 or thread, or to override default input constraints provided by the coordinator module 204 or thread.

In an example implementation, the user interface module 206 may pass to the coordinator module 204, along with the layout and input constraints, changes to default responses to input. For example a default response to the user dragging the thumb 112 in the scroll bar 110 may be for the thumb 112 to move within the track 114 and for the contents of the display to move to the left or right depending on whether the user drags the thumb 112 to the right or left. The user interface module 206 may pass a change or modification to this default response, such as an additional response that the thumb 112 or other component of the scroll bar changes color (such as changing a value of a green component), in response to the user dragging the thumb 112. In another example, the layout and input constraints passed by the user interface module 206 to the coordinator module 204 may include generating a box and a response to input of the coordinator module 204 moving the box in response to the user dragging the box. The user interface module 206 may also pass to the coordinator module 204, along with the layout and input constraints, conditions, and/or changes to defaults, for when the coordinator module 204 should recognize an application-specific gesture and call or wake up the user interface module 206.

The coordinator module 204 may include an input processor 210. The input processor 210 may process input to the computing device 100 received via the input handler 203, such as touch input in a touchscreen display 102 or a trackpad, mouse input, directional input on a keyboard, or other keyed or analog input device. The input processed by the input processor 210 may include raw touch input, such as locations, times, and/or durations of contacts of a user's finger(s) onto the display 102.

The coordinator module 204 may include a gesture recognizer 212. The gesture recognizer 212 may recognize gestures based on the raw touch input processed by the input processor 210. The gesture recognizer 212 may recognize the gestures by comparing the raw touch input to gestures stored in a gesture library 234. The gesture recognizer 212 may, for example, recognize a press, a tap, a click, a swipe, a scroll, or a pinch.

The gesture recognizer 212 may determine whether the recognized gesture merely changes the appearance of elements on the display 102 without involving an application and/or without prompting an action or response by an application, such as sliding the thumb 112 within the track 114 of the scroll bar 110 to change locations of elements on the display 102, or whether the gesture is an application-specific gesture which prompts an action by an application. The determination of whether the gesture is an application-specific gesture may be based on the location on the display 102 of the gesture and a location on the display 102 of user interface elements associated with applications. An application-specific gesture may include, for example, a click on the button 120 (shown in FIG. 1) associated with the application 208. For example, if the gesture is performed on a location of the display 102 where a user interface element of an application is located, then the gesture may be an application-specific gesture which prompts an action and/or response by the application. In another example, a table may present cells to the user. The application 208 may generate more content, for presentation by the display updater 214, than may be visible on the display 102 at one time. As the user scrolls to change which cells are presented, the display updater 214 may change which cells are displayed and/or the content of the displayed cells, without communicating with and/or waking the application 208 and/or user interface module 206. After the user has scrolled beyond a certain distance, the content of the cells to be displayed may no longer be stored by the coordinator module 204, and the coordinator module 204 may have to prompt the application 208 to provide the content of the cells to be displayed to the coordinator module 204. In an example implementation, the coordinator module 204 may request new data from the application 208 based on positional constraints such as a distance, which may be measured in cells, units of measurement (such as inches or centimeters), or pixels, from another location where a cursor was located when the application 208 provided the data to the coordinator module 204. By storing this offset and constraints using this offset, the coordinator module 204 may reduce the number of times that the coordinator module 204 has to wake up the application 208 and/or user interface module 206, allowing the user interface module 206 to sleep and/or wait longer, reducing context switches and saving computing resources.

An example of the user interface module 206 passing to the coordinator module 204, along with the layout and input constraints, conditions, and/or changes to defaults, for when the coordinator module 204 should call or wake up the user interface module 206, may be a number of clicks on the button 120. For example, a default may be for the coordinator module 204 to call or wake up the user interface module 206 in response to the user clicking the button 120 once, but the user interface module 206 may instruct the coordinator module 204 to change this default to call or wake up the user interface module 206 only in response to the user clicking on the button 120 twice within a threshold period of time. The application-specific gesture may thereby be changed from a single click on the button 120 to two clicks on the button 120 within the threshold period of time.

The coordinator 204 may include a display updater 214. The display updater 214 may update the display 102 based on the recognized gesture(s) and the layout and input constraints passed to the coordinator module 204 by the user interface module 206. The display updater 214 may, for example, change locations of, and/or move, elements on the display 102, and/or change the scale of elements on the display 102, which may result in some elements being removed from, or added to, the display 102.

The display updater 214 may include a constraint solver 216. The constraint solver 216 may solve the constraints of the spatial relationships between elements on the display in response to the gestures moving or modifying the elements, to fit the elements within the given size of the display 102.

The constraint solver 216 may solve the layout and gesture constraints according to a Cassowary linear arithmetic constraint solving algorithm or equivalent constraint solver, according to an example implementation.

The display updater 214 may include a location determiner 218. The location determiner 218 may determine the location of elements on the display 102 based on the gestures recognized by the gesture recognizer 212 and the solutions to the constraints determined by the constraint solver 216. Based on the locations determined by the location determiner 218, the coordinator 204 may update the display 102 by locating elements in locations on the display 102 determined by the location determiner 218.

The operating system 202 may include a resource allocator 224. The resource allocator 224 may allocate resources, such as memory, processor time, and/or input and output modules, to processes, such as applications 208, and/or to threads, such as the coordinator module 204 and user interface module 206, running on the computing device 100.

The application 208 process may run on the computing device 100 as a separate process and/or a separate thread. The application 208 may include an entertainment application, such as a game or a movie player, or a productivity application, such as a word processing application or calculator, as non-limiting examples. The application 208 may implement and/or launch the user interface module 206 to handle input events received based on input to the user interface, such as touchscreen input.

The user interface module 206 may run as a thread within the application 208. The user interface module 206 may determine the layout and input constraints for elements on the display 102, and may prompt the application 208 to perform actions in response to the computing device 100 receiving and/or recognizing application-specific gestures. The user interface module 206 and/or application 208 may instruct the graphics module 209 to update the display 102 based on the application-specific gestures, and/or based on output generated by the application 208.

The user interface module 206 may include a constraint constructor 220. The constraint constructor 220 may construct the layout and/or input constraints for presenting elements on the display 102. The layout and input constraints constructed by the constraint constructor 220 may also include changes to when the coordinator module 204 calls or wakes up the user interface module 206. The constraint constructor 220 may construct the layout and/or input constraints based on arguments to an Application Programming Interface (API) call from the user interface module 206 which requests functionality and presentations on the display 102 based on user input, and/or based on requirements of the application 208. The constraint constructor 220 may also construct gesture constraints which limit where user interface elements are moved to in response to recognized gestures. The constraint constructor 220 may construct the layout and input constraints and/or gesture constraints based on at least one hardware specification of the display 102, such as a size of the display 102. The constraint constructor 220 may, for example, construct the layout and input constraints and/or gesture constraints based on the width 106 (shown in FIG. 1), which may be expressed as a pixel width, and the height 108 (shown in FIG. 1) or length, which may be expressed as a pixel length, of the display 102.

The layout and input constraints may define locations of user interface elements with respect to each other, such as a location of a first user interface element (e.g. above, below, to the right of, to the left of, and/or a number of pixels away) on the display 102 with respect to a location of a second user interface element on the display 102. The layout and input constraints may also define locations or other numerical properties of interface elements with respect to numerical properties of input events that may occur during the execution of the application 208, such as a touch event's x coordinate constraining the x coordinate of a scroll bar thumb 112 as well as the thumb's green color value, as non-limiting examples. The constraint constructor 220 may define the layout and input constraints between the user interface elements on the display 102 in a declarative manner, without describing a control flow, allowing other modules of the computing device 100 to determine how to implement the constraints. After the constraint constructor 220 constructs the layout and input constraints, the user interface module 206 may pass the layout and input constraints to the coordinator module 204. After passing the layout and input constraints to the coordinator module 204, the user interface module 206 may go to sleep and/or wait for the coordinator module 204 to send a signal to and/or wake up the user interface module 206 by passing and/or sending the application-specific gesture to the user interface module 206. While the user interface module 206 is asleep and/or waiting, the application 208 may also go to sleep and/or wait. The going to sleep and/or waiting by the user interface module 206 and/or application 208 while the coordinator module 204 handles updating the display 102 in response to inputs such as touch inputs may reduce the number of context switches compared to both a user interface module and compositor module working together to update a display in response to inputs that do not prompt actions by applications, saving computing resources.

In response to receiving the application-specific gesture from the coordinator module 204, the user interface module 206 may wake up and/or resume. The user interface module 206 may include an application prompter 222. The application prompter 222 may cause the application 208 to wake up, and/or may prompt the application 208 to perform an action in response to receiving the application-specific gesture. The application 208 may respond to the prompt by performing an action, such as performing a calculation and displaying the result, retrieving a new web page, or playing a movie, according to example implementations.

The computing device 100 may include at least one processor 226. The at least one processor 226 may execute instructions, such as instructions 230 stored in memory 228, to cause the computing device 100 to perform any combination of the methods, functions, and/or techniques described herein.

The computing system may include a memory 228. The memory 228 may include at least one non-transitory computer-readable storage medium, such as a storage device. The memory 228 may include instructions 230. The instructions 230, when executed by at least one processor, may be configured to cause the computing device 100 to perform any combination of the methods, functions, and/or processes described herein.

The memory 228 may also include data 232. The data 232 may include data generated as a result of performing any of the methods, functions, and/or processes described herein, and/or used to perform any of the methods, functions, and/or processes described herein. The data 232 may include, for example, a gesture library 234. The gesture recognizer 212 may access the gesture library 234 to determine whether to recognize raw touch input as a gesture. The data 232 may also include layout and input constraints 236. The layout and input constraints 236 may have been generated by the constraint constructor 220, and accessed by the constraint solver 216.

The computing device 100 may also include an input/output module 238. The input/output module 238 may include one or more input interfaces and one or more output interfaces. The input interfaces and output interfaces may include wired or wireless nodes for communicating with other computing systems, such as access points and/or base stations. The input interface(s) may include a keyboard, mouse, touchscreen, and/or microphone (for which input may be received by the input handler 203), as non-limiting examples. The output interface(s) may include a display (such as the display 102) and/or speaker, as non-limiting examples.

Figure 3:
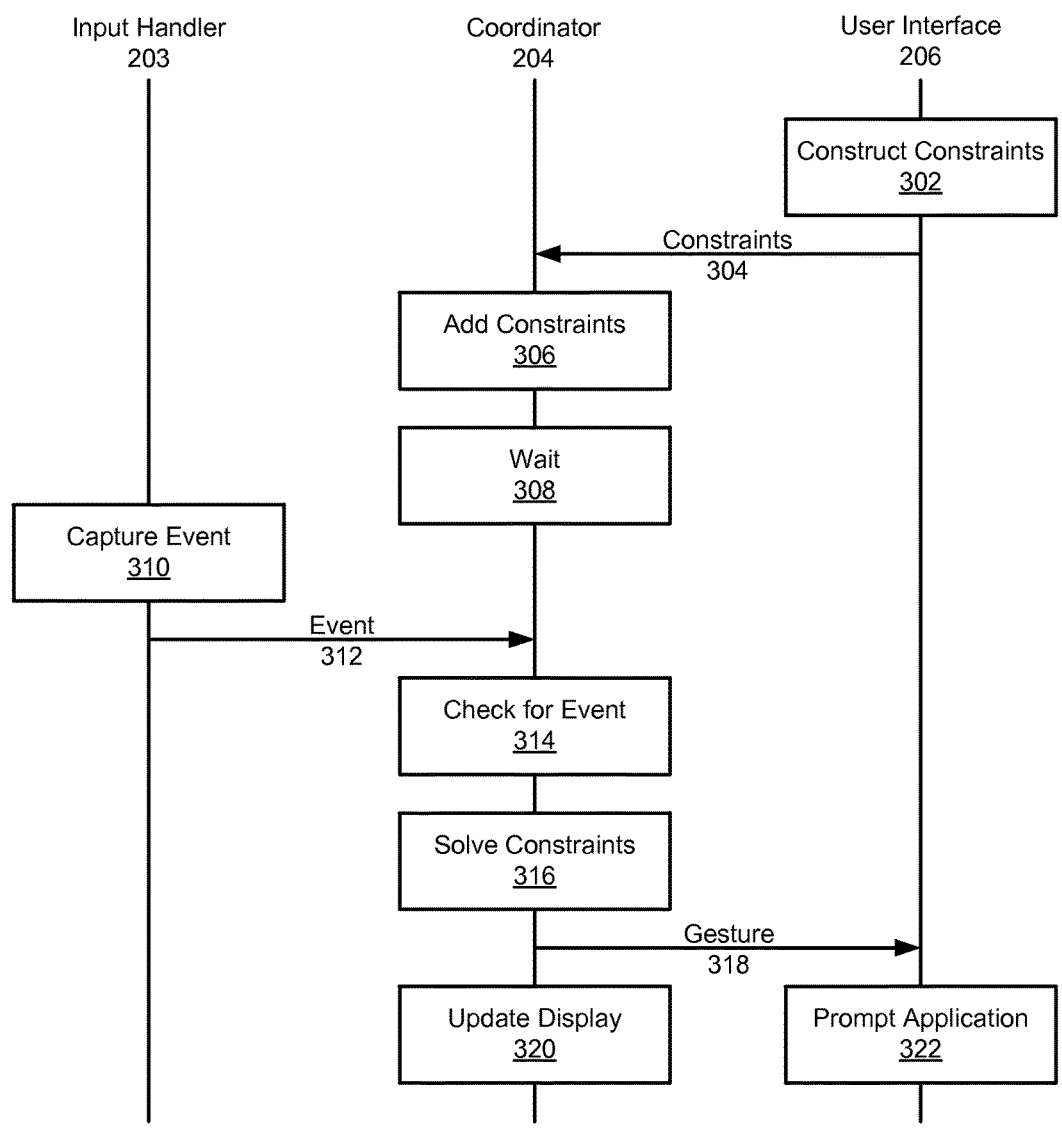
FIG. 3 is a timing diagram showing functions performed by elements of the computing device according to an example implementation.

FIG. 3 is a timing diagram showing functions performed by elements of the computing device 100 according to an example implementation. In this example, the constraint constructor 220 of the user interface module 206 and/or thread may construct constraints (302). The constraint constructor 220 may, for example, construct a constraint graph defining constraints between elements on the display 102 in accordance with requirements of the application 208. The user interface module 206 may pass the constructed constraints 304 to the coordinator module 204. After passing the constructed constraints 304 to the coordinator module 204, the user interface module 206 may go to sleep and/or wait for a signal from the coordinator module 204. The going to sleep and/or waiting by the user interface module 206 (and/or application 208) while the coordinator module 204 handles updating the display 102 in response to inputs such as touch inputs that do not invoke any applications may reduce the number of context switches compared to involving both a user interface module and compositor module working together to update a display in response to inputs, saving computing resources.

The coordinator module 204 may add the constraints to the constraint solver 216 (306). After adding the constraints (306), the coordinator module 204 may wait (308), such as by waiting for an input event and/or touch event. The coordinator module 204 may also wait for the graphics module 209 to become ready for an update to the display 102. The graphics module 209 may send a synchronization signal to the coordinator module 204 indicating that the graphics module 209 is ready to update and/or change the image presented by the display 102.

In response to receiving an input such as a touch input to hardware such as a touchscreen, the input handler 203 may capture the event (310). The input handler 203 may capture the event (310) by receiving data associated with the event from the input/output module(s) 238. The input handler 203 may pass the data associated with the event 312 to the input processor 210 of the coordinator module 204.

The coordinator module may check for events (314), such as touch events. After the input processor 210 receives the event 312 and the gesture recognizer 212 recognizes a gesture based on the input, the constraint solver 216 may solve the constraints (316) based on the constraints 304 received from the user interface module 206 and the recognized gesture. The coordinator module 204 may also update the display (320) based on the gesture, such as by rendering a presentation to the display 102, which may include changing locations of elements on the display 102.

If the coordinator module 204 determines that the gesture recognized based on the event 312 is an application-specific gesture, then the coordinator module 204 may pass the gesture 318 to the user interface module 206. The gesture 318 may function as, and/or be sent along with, a semaphore, waking the user interface module 206 up and/or causing the user interface module 206 to resume. In response to receiving the gesture 318 from the coordinator module 204, the user interface module 206 may prompt the application 208 (322) to perform an action based on the gesture.

Figure 4:
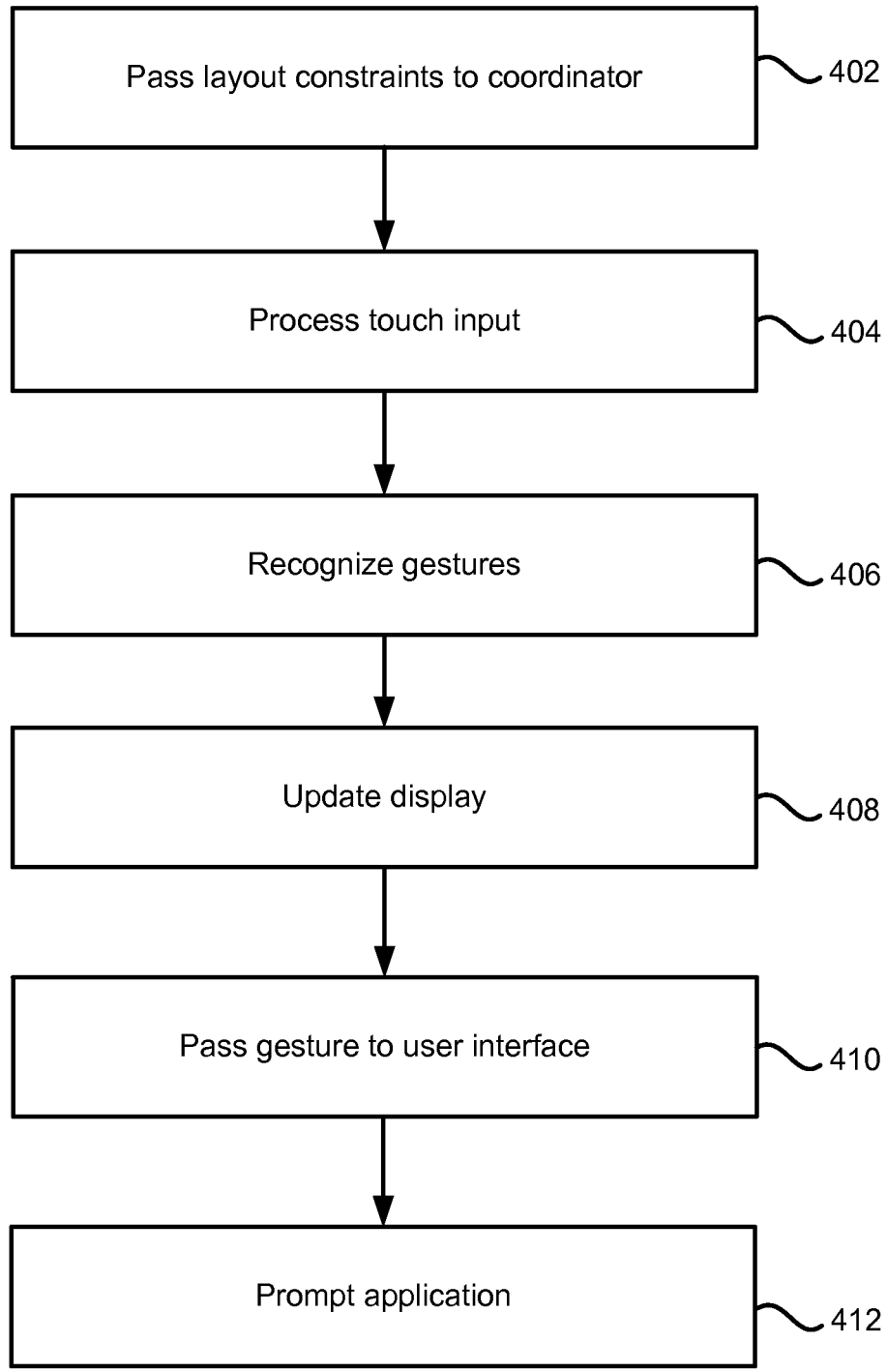
FIG. 4 is a flowchart showing a method performed by the computing device according to an example implementation.

FIG. 4 is a flowchart showing a method performed by the computing device 100 according to an example implementation. According to this example, the method may include the user interface module 206 or thread passing layout and input constraints to the coordinator module 204 of thread (402). The method may also include the coordinator module 204 or thread processing input received by the computing device 100 (404). The method may also include the coordinator module 204 or thread recognizing gestures based on the input (406). The method may also include the coordinator module 204 or thread updating the display 102 based on the recognized gestures and the layout constraints passed to the coordinator module 204 or thread by the user interface module 206 or thread (408). The method may also include the coordinator module 204 or thread, in response to recognizing an application-specific gesture, passing the application-specific gesture to the user interface module 206 or thread (410). The method may also include the user interface module 206 or thread prompting an application process to perform an action in response to receiving the application-specific gesture from the coordinator module 204 or thread (412).

According to an example implementation, the layout constraints may define at least a location of a first user interface element 120 on the display 102 with respect to a location of a second user interface element 110 on the display 102.

According to an example implementation, the layout constraints may define constraints between user interface elements 110, 120 on the display 102 without describing a control flow.

According to an example implementation, the method may further include the user interface module 206 or thread constructing the layout constraints based on at least one hardware specification of the display 102.

According to an example implementation, the method may further include the user interface module 206 or thread constructing the layout constraints based on a pixel width 106 of the display and a pixel length or height 108 of the display 102.

According to an example implementation, the method may further include the user interface module 206 or thread passing a definition of the application-specific gesture to the coordinator module.

According to an example implementation, the input may be received via a touchscreen 102 included in the computing device 100.

According to an example implementation, the updating the display 102 (408) may include determining a location on the display 102 of at least one user interface element, 110, 120.

According to an example implementation, the updating the display 102 (408) may include solving layout and gesture constraints.

According to an example implementation, the updating the display 102 (408) may include solving layout and gesture constraints based on a Cassowary linear arithmetic constraint solving algorithm.

According to an example implementation, the application-specific gesture may include a gesture that prompts a response from an application 208 running on the computing device 100.

According to an example implementation, the application-specific gesture may include a click on a button 120 associated with an application 208 running on the computing device 100.

According to an example implementation, the method may further include the user interface module 206 or thread prompting an application 208 to perform an action in response to receiving the application-specific gesture from the coordinator module 204 or thread.

According to an example implementation, the user interface module 206 may be implemented on a first thread, and the coordinator module 204 may be implemented on a second thread.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments described herein.

What is claimed is:

1. A non-transitory computer-readable storage medium comprising instructions stored thereon that, when executed by at least one processor, are configured to cause a computing device to implement at least:
    a user interface thread configured to:
        pass layout constraints to a coordinator thread;
        pass conditions to the coordinator thread defining when the coordinator thread recognizes an application-specific gesture and wakes up the user interface thread, wherein at least one of the conditions is a change to a default condition, wherein the conditions defining when the coordinator thread recognizes the application-specific gesture include conditions defining gestures which prompt an action by an application;
        after passing the layout constraints and the conditions to the coordinator thread, go to sleep; and
        in response to receiving the application-specific gesture from the coordinator thread and being prompted to wake up by the coordinator thread, wake up and prompt the application to perform the action based on the application-specific gesture; and
    the coordinator thread configured to:
        process a first input received by the computing device;
        determine that the first input is not the application-specific gesture based on a location on a display of the computing device of the first input and a user interface element receiving the first input and based on the conditions defining when the coordinator thread recognizes the application-specific gesture;
        update the display, while the user interface thread is sleeping, based on the first input, the determination that the first input is not the application-specific gesture, and the layout constraints passed to the coordinator thread by the user interface thread;
        wherein updating the display includes changing an appearance of the user interface element on the display without prompting the application;
        process a second input received by the computing device;
        determine that the second input is the application-specific gesture based on the conditions defining when the coordinator thread recognizes the application-specific gesture passed by the user interface thread; and
        in response to determining that the second input is the application-specific gesture, pass the application-specific gesture to the user interface thread, the passing the application-specific gesture to the user interface thread prompting the user interface thread to wake up.

2. The non-transitory computer-readable storage medium of claim 1, wherein the layout constraints define at least a location of a first user interface element on the display with respect to a location of a second user interface element on the display.

3. The non-transitory computer-readable storage medium of claim 1, wherein the layout constraints define constraints between user interface elements on the display without describing a control flow.

4. The non-transitory computer-readable storage medium of claim 1, wherein the user interface thread is further configured to construct the layout constraints based on at least one hardware specification of the display.

5. The non-transitory computer-readable storage medium of claim 1, wherein the user interface thread is further configured to construct the layout constraints based on a pixel width of the display and a pixel length of the display.

6. The non-transitory computer-readable storage medium of claim 1, wherein the input is received via a touchscreen included in the computing device.

7. The non-transitory computer-readable storage medium of claim 1, wherein the updating the display includes determining a location on the display of at least one user interface element.

8. The non-transitory computer-readable storage medium of claim 1, wherein the updating the display includes solving layout and gesture constraints.

9. The non-transitory computer-readable storage medium of claim 1, wherein the updating the display includes solving layout and gesture constraints based on a Cassowary linear arithmetic constraint solving algorithm.

10. The non-transitory computer-readable storage medium of claim 1, wherein the application-specific gesture includes a gesture that prompts a response from the application.

11. The non-transitory computer-readable storage medium of claim 1, wherein the application-specific gesture includes a click on a button associated with the application.

12. The non-transitory computer-readable storage medium of claim 1, wherein the user interface thread is further configured to prompt the application to perform an action in response to receiving the application-specific gesture from the coordinator thread.

13. The non-transitory computer-readable storage medium of claim 1, wherein the user interface thread is further configured to pass, to the coordinator thread, conditions for the coordinator thread to wake up the user interface thread.

14. The non-transitory computer-readable storage medium of claim 1, wherein the user interface thread is further configured to inform the coordinator thread of constraints between properties of future input events and user interface elements.

15. A computing device comprising:
a touchscreen configured to display user interface elements and receive touch input;
at least one processor; and
at least one memory device comprising instructions stored thereon that, when executed by the at least one processor, are configured to cause the computing device to implement:
a user interface thread configured to:
pass layout constraints to a coordinator thread;
pass conditions to the coordinator thread defining when the coordinator thread recognizes an application-specific gesture and wakes up the user interface thread, wherein at least one of the conditions is a change to a default condition, wherein the conditions defining when the coordinator thread recognizes the application-specific gesture include conditions defining gestures which prompt an action by an application;
after passing the layout constraints to the coordinator thread, go to sleep; and
in response to receiving the application-specific gesture from the coordinator thread and being prompted to wake up by the coordinator thread, wake up and prompt the application to perform the action based on the application-specific gesture; and
the coordinator thread configured to:
process a first touch input received by the touchscreen;
determine that the first touch input is not the application-specific gesture based on a location on the touchscreen of the computing device of the first touch input and a user interface element receiving the first input and based on the conditions defining when the coordinator thread recognizes the application-specific gesture;
update the touchscreen, while the user interface thread is sleeping, based on the first touch input, the determination that the first touch input is not the application-specific gesture, and the layout constraints passed to the coordinator thread by the user interface thread;
wherein updating the touchscreen includes changing an appearance of the user interface element on the touchscreen without prompting the application;
process a second touch input received by the computing device;
determine that the second touch input is the application-specific gesture based on the conditions defining when the coordinator thread recognizes the application-specific gesture passed by the user interface thread; and
in response to determining that the second input is the application-specific gesture, pass the application-specific gesture to the user interface thread, the passing the application-specific gesture to the user interface thread prompting the user interface thread to wake up.

16. The computing device of claim 15, wherein the layout constraints define at least a location of a first user interface element on the touchscreen with respect to a location of a second user interface element on the touchscreen.

17. The computing device of claim 15, wherein the user interface thread is further configured to construct the layout constraints based on a pixel width and a pixel length of the touchscreen.

18. The computing device of claim 15, wherein the application-specific gesture includes a gesture that prompts a response from an application running on the computing device.

19. The computing device of claim 15, wherein the user interface thread is further configured to prompt the application to perform the action in response to receiving the application-specific gesture from the coordinator thread.

20. A method performed by a computing device, the method comprising:
passing, by a user interface thread, layout constraints to a coordinator thread;
passing, by the user interface thread to the coordinator thread, conditions defining when the coordinator thread recognizes an application-specific gesture and wakes up the user interface thread, wherein at least one of the conditions is a change to a default condition, wherein the conditions defining when the coordinator thread recognizes the application-specific gesture include conditions defining gestures which prompt an action by an application;

after passing the layout constraints and the conditions to the coordinator thread, the user interface thread going to sleep;

in response to receiving the application-specific gesture and being prompted to wake up by the coordinator thread, the user interface thread waking up and prompting the application to perform the action based on the application-specific gesture;

processing, by the coordinator thread, a first input received by the computing device;

determining, by the coordinator thread, that the first input is not the application-specific gesture based on a location on a display of the computing device of the first input and a user interface element receiving the first input and based on the conditions defining when the coordinator thread recognizes the application-specific gesture;

updating the display by the coordinator thread, while the user interface thread is sleeping, based on the first input, the determination that the first input is not the application-specific gesture, and the layout constraints passed to the coordinator thread by the user interface thread;

wherein updating the display includes changing an appearance of the user interface element on the display without prompting the application;

processing, by the coordinator thread, a second input received by the computing device;

determining, by the coordinator thread, that the second input is the application-specific gesture based on the conditions defining when the coordinator thread recognizes the application-specific gesture passed by the user interface thread; and in response to determining that the second input is the application-specific gesture, passing, by the coordinator thread, the application-specific gesture to the user interface thread, the passing the application-specific gesture to the user interface thread prompting the user interface thread to wake up.

* * * * *